United States Patent [19]
Chatterjea

[11] 3,874,468
[45] Apr. 1, 1975

[54] ELECTRIC CONTROLS FOR HYDROSTATIC TRANSMISSIONS

[75] Inventor: Probir K. Chatterjea, Des Plaines, Ill.

[73] Assignee: International Harvester Company, Chicago, Ill.

[22] Filed: Apr. 9, 1973

[21] Appl. No.: 349,133

[52] U.S. Cl............ 180/6.48, 74/471 XY, 180/6.5, 180/77 H
[51] Int. Cl.......................................... B62d 11/04
[58] Field of Search ......... 180/6.48, 6.5, 6.3, 77 H; 74/471 XY

[56] References Cited
UNITED STATES PATENTS 2,565,293  8/1951  Aydelott et al...................... 180/6.5
3,481,417  12/1969  Jarret et al.......................... 180/6.5

Primary Examiner—David Schonberg
Assistant Examiner—John A. Pekar
Attorney, Agent, or Firm—John W. Gaines; Floyd B. Harman

[57] ABSTRACT

Electric controls for a vehicle having two drive mechanisms operated in the same direction and speed for straight forward movement of the vehicle and for straight rearward movement thereof and operated in opposite directions for steering of the vehicle to the right and to the left. A first set of parallel resistances, which may be operated by one type of movement of a joy stick, control straight forward and backward movement of the vehicle. A second set of parallel resistances, which may be operated by a different movement of the joy stick, control turning of the vehicle.

10 Claims, 3 Drawing Figures

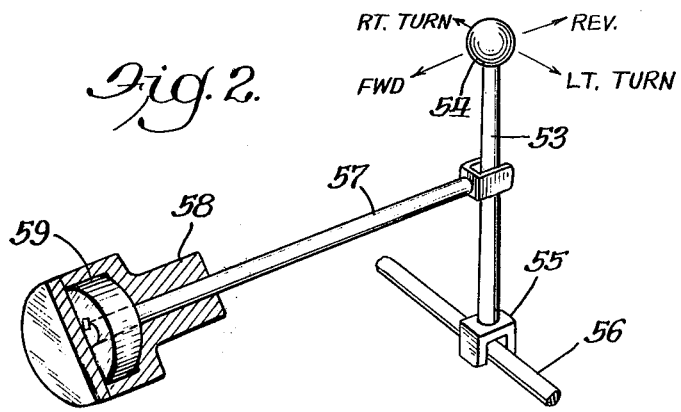
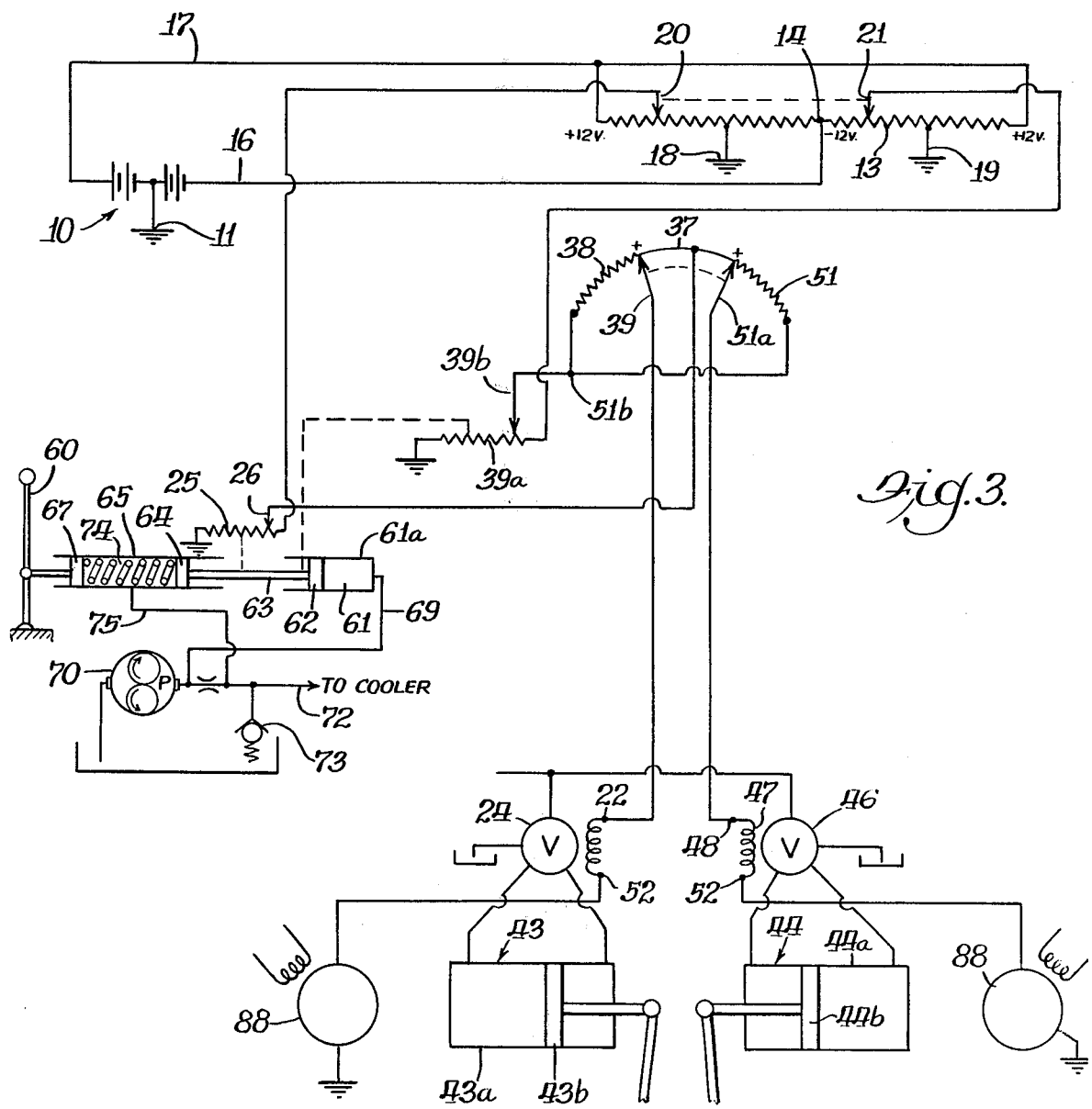

ELECTRIC CONTROLS FOR HYDROSTATIC TRANSMISSIONS

This invention relates to electric controls for a hydrostatic transmission. More specifically, the invention relates to the use of a plurality of sets of electrical resistances to which electric potentials are applied in various ways for governing straight forward and reverse movement of the vehicle and turning thereof to the right and to the left.

It is of considerable advantage to employ a single member or unitary device for controlling forward and reverse movements and turning of a vehicle, for in this way operation of the vehicle is simplified and safer. Thus, with a single control, turning is easily separated from straight-line operation in forward or reverse.

According to the present invention, a single control for turning and straight-line movement is used. The parts used for turning are so connected with those producing straight-line movememt that the total number of parts is kept low. Reliability of operation is achieved because one type of movement of the control produces turning and another type produces straight-line movment. Moreover, unitariness of construction is achieved, because the control acts directly against one set of parts for one vehicle movement and indirectly through said one set against another set of parts for another movement.

BRIEF DESCRIPTION OF THE DRAWINGS

FIG. 2 is a perspective view of a joy stick and associated parts for operating the electric controls of the present invention; and FIG. 3 is a diagrammatic view of a second species of electric controls, according to the present invention.

As shown in FIG. 1, a direct-current source of power 10 has a round 11 and may comprise two 12 volt batteries connected in series, with the ground 11 connected therebetween so that in effect one side of the power source 10 is at a negative potential of 12 volts and the other side at a positive potential of 12 volts. The power source 10 is connected across two parallel resistances 12 and 13 having points of connection 14 and 15 with one another, the connection point 14 being at a negative potential of 12 volts through a conductor 16 leading to the negative side of the power source 10, the connection point 15 being at a positive potential of 12 volts through a conductor 17 leading to the positive side of the power source 10. The resistances 12 and 13 extend generally along straight lines and in opposite directions to one another, whether considered from the point of connection 14 or from the point of connection 15. Mid points of the resistances 12 and 13 have grounds 18 and 19. The resistances 12 and 13 are contacted by take-off leads 20 and 21, respectively, which are conjointly movable along the resistances 12 and 13. When the take-off leads 20 and 21 are positioned as shown in FIG. 1, they are at about plus 6 volts and minus 6 volts, respectively. Movement of the take-off leads 20 and 21 to the left as viewed in FIG. 1 from the position shown in that figure increases the voltage of the take-off lead 20 to as much as plus 12 volts and that of the take-off lead 21 to as much as minus 12 volts. Movement of the take-off leads 20 and 21 to the right decreases the positive voltage of the take-off lead 20 and the negative voltage of the take-off lead 21 to zero, switches the signs of the voltages, and increases them to as much as minus 12 volts and plus 12 volts, respectively.

Figure 1:
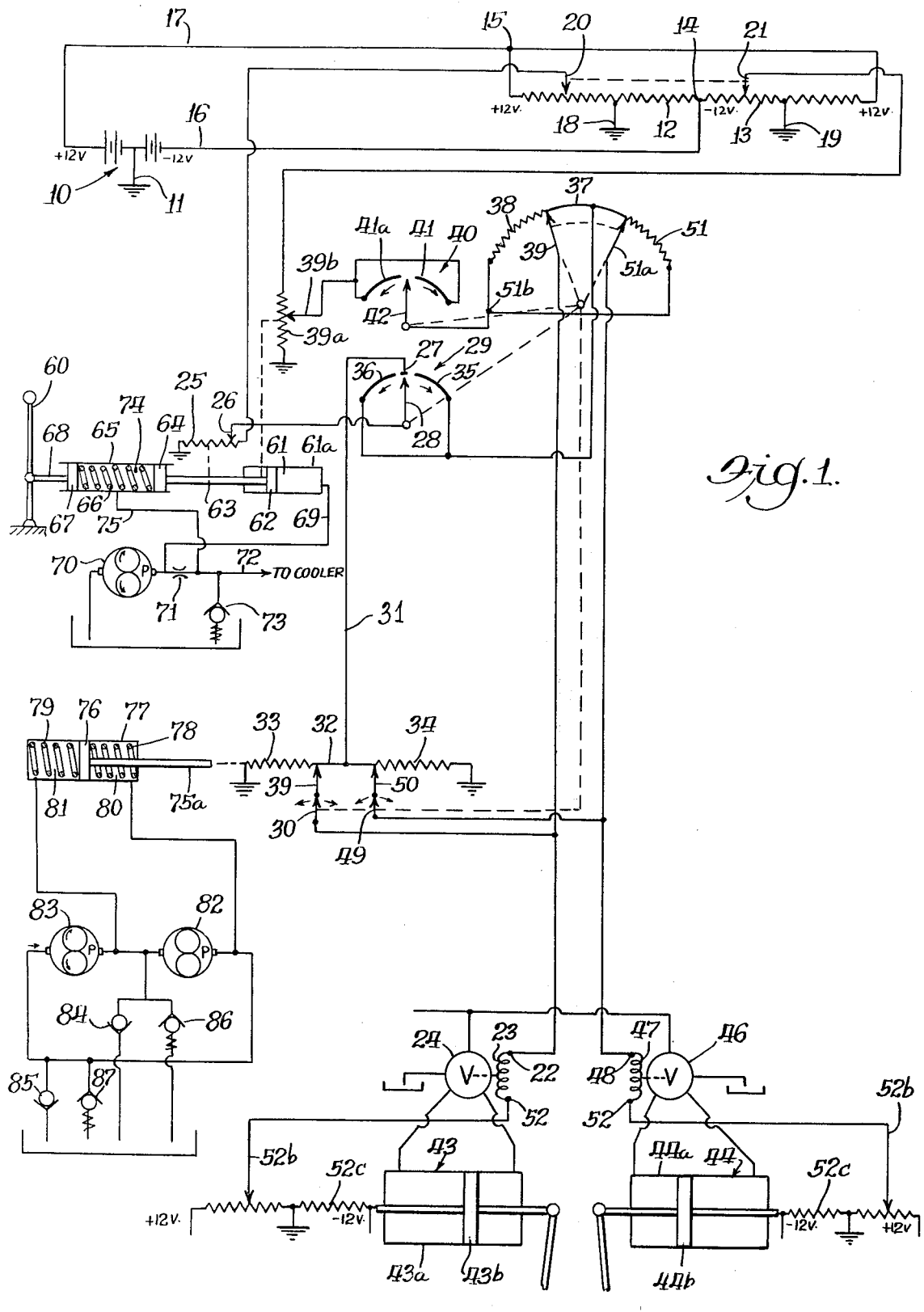
FIG. 1 is a diagrammatic view of one species of the present invention involving electric controls for operating hydrostatic transmissions.

The take-off lead 20 is connected with a terminal 22 of a coil 23 controlling a valve 24, by way of a take-off lead 26 and on occasion a grounded resistance 24 contactable thereby, and thence by one of two paths. One path comprises a central contact 27, an arm 28, both being part of a switch 29, a switch 30, a lead 31, and a conductor 32, and on occasion a resistance 33. The resistance 33 is grounded at one end, as is a resistance 34, and the other ends of these resistances are connected to opposite ends of the conductor 32.

The other path comprises one of two arcuate side contacts 35 and 36 of the switch 29, the arm 28 thereof, an arcuate conductor 37, on occasion an arcuate resistance 38, and a take-off lead 39 contactable with the conductor 37 or the resistance 38. The conductor 37 is connected with one end of the resistance 38. When the take-off lead 20 is connected with the terminal 22 of the coil 23 by the last mentioned path involving one of the side contacts 35 and 36 of the switch 29, the take-off lead 21 is also connected with the terminal 22 of the coil 23 by way of a take-off lead 39b, on occasion a grounded resistance 39a contactable thereby, a switch 40, the resistance 38, and the take-off lead 39. The switch 40 comprises two side contacts 41 and 41a and an arm 42.

The valve 24 is employed to control the flow of hydraulic pressure fluid to and from a power unit 43 composed of a cylinder 43a and a piston 43b slidably mounted therein and connected with a swash plate (not shown) of a pump (not shown) for driving one of two drive mechanisms (not shown) for a vehicle, for example, the one at the left side of the vehicle. The tilting head for the pump for the drive mechanism at the right side of the vehicle is controlled by a power unit 44 composed of a cylinder 44a and a piston 44b slidable therein and connected to another tilting head (not shown). The power unit 44 is controlled by a valve 46 governing the flow of pressure fluid to and from the power unit 44, which valve is operated by a coil 47 having a terminal 48. The terminal 48 is connected with the take-off lead 20 through the take-off lead 26 and on occasion the resistance 25 and thence by way of one of two paths. One path involves a switch 49, a take-off lead 50, the conductor 32, and on occasion the grounded resistance 34. The other path involves the switch arm 28 and one of the arcuate terminals 35 and 36 of the switch 39, the arcuate conductor 37, on occasion an arcuate resistance 51, and a take-off lead 51a. When the terminal 48 of the coil 47 of the valve 46 is connected via the last mentioned path with the take-off lead 20, the take-off lead 21 is also connected with the terminal 48 by a path comprising one of the arcuate terminals 40 and 41, the arm 42, the arcuate resistance 51, and the take-off lead 51a .

The arcuate resistances 39 and 51 are connected to opposite ends of the arcuate conductor 37 and extend away from one another from the ends of the conductor 37 generally along the arc on which the conductor 37 is formed. The inner or adjacent ends of the arcuate resistances 39 and 51 are spaced from one another by the length of the arcuate conductor 37. Conductors leading from outer or remote ends of the arcuate resistances 38 and 51 have a connection point 51b . The resistances 38 and 51 are in parallel with one another by virtue of the connection of their remote ends through the connection point 51b and the connection of their adjacent ends through the arcuate conductor 37.

Each of the control coils 23 and 47 for the valves 24 and 46 has a terminal 52 which is connected to take-off lead 52b contactable with a resistance 50c having a ground at a mid point and its ends connected to suitable positive and negative potentials of 12 volts such as supplied by the power source 10. When the terminals 52 and 22 or 48 are at the same potential, no current flows through the coil 23 or 47, and the valve 24 or 26 is positioned so as to block the flow of pressure fluid to and from the cylinder 43a or 44a and thus to fix the position of the piston 43b or 44b. Thus, the swash plate of the associated pump for the associated drive mechanism is fixed, and the speed of the drive mechanism in one direction or the other is fixed. Each resistance 52c is connected with the associated piston 43b or 44b so as to be movable therewith with respect to the associated take-off lead 52b. When the piston 43b or 44b is located in the cylinder 43a or 44a so as to position the associated swash plate for a neutral condition of the associated drive mechanism, the associated take-off lead 52b is at the grounded region of the associated resistance 52c.

The positioning of the take-off leads 20 and 21 along the resistances 12 and 13 determines whether the vehicle is moved in forward or reverse, and the positioning of the take-off leads 39 and 52 along the resistance 38 and 51 and the conductor 57 determines whether the vehicle is moved in a straight line or is turned to the right or left. The resistances 12 and 13 are straight and the take-off leads 20 and 21 may be moved in contact with them in a straight line by means of a joy stick 53, which is illustrated in FIG. 2. The joy stick 53 is generally vertical and has an upper end 54 enlarged in the shape of a ball for engagment by the hand of an operator, a fork 55 at its lower end receiving a fixed rod 56, and pivotal connection at a mid region with one end of a rod 57 slidably mounted in a fixed housing 58. The slidable rod 57 is perpendicular to a plane containing the fixed rod 56. The take-off leads 20 and 21 are preferably associated with the rod 57, and the resistances 12 and 13, with the housing 58, so that as the joy stick 53 is moved forward or backward as indicated by the arrows marked "FWD" and "REV" in the plane of the rod 57, the joy stick pivots about the fixed rod 56 and moves the rod 57 axially in the fixed housing 58 so that the take off leads 20 and 21 move along the resistances 12 and 13.

One or more rotors 59 are mounted in the housing 58 so as to be hold against axial movement and keyed to the rod 57 so as to rotate therewith and preferably carry the switch arms 28 and 42, switches 30 and 49, and take-off leads 39 and 51. Thus, as the joy stick 53 is moved in the direction for forward or reverse and not to the right or left, the rod 57 merely has longitudinal movment, and the rotor 59 does not move. When the joy stick 53 is moved to the left or right, as indicated by the arrows marked "LT. TURN" and "RT. TURN," the fork 55 slides along the fixed rod 56, and the rod 57 is rotated by the joy stick and rotates the rotor or rotors 59 as well as the switch arms 28 and 42, switches 30 and 49, and take-off leads 39 and 51a connected therewith.

When the joy stick 53 is in a neutral position midway between forward and reverse, the take-off leads 20 and 21 are to the right of the position shown in FIG. 1 at the regions of the resistances 12 and 13 connected with the grounds 18 and 19. Since the terminals 22 and 48 of the control coils 23 and 47 of the valves 24 and 46 are connected with the take-off leads 20 and 21, the terminals 22 and 48 are at ground voltage. The terminals 52 will also be at ground voltage, since the take-off leads 52b will be at the grounded regions of the resistances 52c, because the pistons 43b and 44b controlling the positions of the resistances 52c are located for neutral positions of the swash plates. When the vehicle is to be driven forward, the joy stick 53 is pushed in the direction of the arrow marked "FWD" to move the rod 57 and the take-off leads 20 and 21 movable therewith to the left as viewed in FIGS. 1 and 2 until, for example, the take-off leads 20 and 21 reach the position of FIG. 1. In this position the take-off lead 20 engages a region of the resistance 12 at a positive potential of about 6 volts. The positive potential of about 6 volts at the take-off lead 20 will also be at the terminals 22 and 48 of the control coils 23 and 47 if the take-off lead 26 contacts the end of the resistance 25 away from its grounded end and the take-off leads 31 and 50 both contact the conductor 32. The conditions will be explained presently under which the take-off lead 26 moves relatively toward the grounded end of the resistance 25 and the take-off lead 31 or 50 contacts the resistance 33 or 34.

At the start of drive, the terminals 52 of the control coils 23 and 47 are at zero or ground potential, and so the +6 volts at terminals 22 and 48 makes current flow through the coils 23 and 47 in such direction as to urge the pistons 43b and 44b to the left and right, respectively, for forward driving of the drive mechanisms through shifting of the swash plates connected with the pistons and operating the pumps controlling the drive mechanisms. When the pistons 43b and 44b have positioned the swash plates for a forward drive corresponding to the speed called for by the amount of displacement of the joy stick 53, the rod 57, and the take-off lead 20 to the left as viewed in FIGS. 1 and 2, the pistons 43b and 44b will have moved the resistances 52c to the right and to the left, respectively, so that the take-off leads 52b and the terminals 52 are at a positive potential of about 6 volts, balancing that same potential at the terminals 22 and 48. Thus, energization of the coils 23 and 47 is stopped, and the valves 24 and 46 are returned to a position blocking fluid flow to and from the cylinders 43a and 44a and fixing the positions of the pistons 43b and 44b therein. Thus, the tilting heads of the driving pumps are fixed in position, and the speed of the drive mechanisms in forward is fixed.

The spacing of the take-off lead 20 to the left as viewed in FIG. 1 of the mid grounded region of the resistance 12 determines the speed of the drive mechanisms in the forward direction. When the forward speed of the vehicle is to be diminished, brought to 0, or reversed, the take-off lead 20 is moved to the right as viewed in FIG. 1 along the resistance 12. NOw the terminals 22 and 48 of the control coils 23 and 47 are at a smaller positive voltage than the terminals 52 or at zero voltage or at a negative voltage, so that current flows in the coils 23 and 47 so as to make the valves 24 and 46 move the pistons 43b and 44b to the left and to the right, respectively, for lowering the forward speed of the drive mechanism, producing zero speed thereof, or reversing the direction of drive. The tilting heads of the pumps driving the drive mechanisms bring the take-off lead 52b to new positions on the resistances 54, with the result that the terminals 52 are again brought to the same voltage as the terminals 22 and 48.

When the vehicle is to be steered to the right or to the left, the joy stick 53 is shifted in the direction of the arrow marked "RT. TURN" or "LT. TURN" indicated in FIG. 2 to shift the rod 57 and the rotor or rotors 59 angularly. As shown in FIG. 1, such angular shifting will bring about conjoint angular movment of the take-off leads 39 and 52 along the resistances 38 and 51 and the arcuate conductor 37, contact of the arm 42 with the arcuate contact 40 or 41, and contact of the arm 28 with the arcuate side contact 35 or 36 of the switch 29, and opening of the switches 30 and 49, because certain of the elements just mentioned are carried by the rotor or rotors 59, as previously explained. When the arm 42 engages the contact 40 or 41, the take-off lead 21 is connected with the remote ends of the arcuate resistances 39 and 51. Thus, when the take-off lead 21 is positioned as shown in FIG. 1, the remote ends of the resistances 38 and 51 are at about 6 minus volts. The positive potential of about 6 volts applied to the take-off lead 20 in the position of FIG. 1 is applied by way of the contact arm 29 and the contact 35 or 36 and the conductor 37 to the adjacent ends of the resistances 38 and 51.

If, for example, the vehicle is to be turned to the left, the take-off leads 39 and 51a are conjointly moved counterclockwise as viewed in FIG. 1 along the resistance 38 and the conductor 37, respectively. Depending on the amount of counterclockwise movement of the take-off lead 39 along resistance 38, take-off lead 39 and terminal 22 of coil 23 go from a positive potential of about 6 volts to a smaller positive potential, to zero potential, or to a negative potential, possibly as much as 6 volts. Just before the movment of take-off lead 39 along resistance 38 toward its outer end, the voltage at terminal 22 was equal to that at temrinal 52 of coil 23. With such movement of take-off lead 39, the voltage at terminal 22 becomes less than that at terminal 52. Thus, a reverse current flows in the coil 23 causing the valve 24 to move the piston 43b to the left in the cylinder 43a as viewed in FIG. 1. Thus, the left-hand drive mechanism of the vehicle is driven at a reduced forward speed is stopped, or is reversed. There will be no change in the drive of the right-hand drive mechanism of the vehicle, for the take-off lead 51a will merely have moved counterclockwise as viewed in FIG. 1 along the arcuate conductor 37 toward the resistance 38. Thus, the take-off lead 51a continues at the same positive voltage of about 6, the terminal 48 continues at this voltage, and there is no change in control of the right-hand drive mechanism. The vehicle is turned to the left.

When the vehicle is to be turned to the right, the joy stick 53 turns the rod 57 and rotor or rotors 59 so that the take-off leads 39 and 51a are moved angularly in a clockwise direction as viewed in FIG. 1, with the result that the take-off lead 39, moving along the conductor 37, stays at the same voltage and maintains the same voltage at the terminal 22 of the control coil 23, and the take-off lead 51a moves along the resistance 51 from the inner end at a positive voltage of 6 toward the outer end at a negative voltage of 6. The result is that the voltage at terminal 48 of control coil 47 is lowered, brought to zero, or reversed in sign and becomes less than at terminal 52 of coil 47, and valve 46 moves piston 44b to the right as viewed in FIG. 1. Consequently, the right-hand drive mechanism is driven at a reduced forward speed, is stopped, or is reversed. The lefthand drive mechanism stays at its same forward speed, since the voltage at take-off lead 29 and terminal 22 remains unchanged. Since the left-hand drive mechanism continues at the same forward speed and the right-hand drive mechanism is reduced in speed, stopped, or reversed, the vehicle is turned to the right.

In the description just given, it has been assumed that in straight-line operation of the vehicle, for example, both sides of the vehicle are driven at the same speed. Thus, for reasons to be stated later, the take-off leads 31 and 50 both engage only the conductor 32, rather than the conductor 32 and the resistance 33 or 34, and the voltage at the terminals 22 and 48 of the control coils 23 and 47 is that at the take-off lead 26. When the vehicle engine is operating normally, the resistance 25 is so positioned with respect to take-off lead 26 the end of the resistance away from its grounded end is contacted by the take-off lead. In this position of resistance 25, the voltage of take-off lead 26 is that of take-off lead 20. Since the terminals 22 and 48 of the control coils 23 and 47 have the same voltage as the take-off lead 26, these terminals are at the voltage of take-off lead 20. When the eingine tends to stall, however, the take-off lead 26 in effect moves along the resistance 25 toward its grounded end and so has its voltage, as well as that of coil terminals 22 and 48, reduced from the positive or negative voltage of the take-off lead 20 toward the zero or ground voltage.

Such shifting of the take-off lead 26 with respect to the resistance 25 is produced by disturbance of balance between the position of throttle 60 and pressure in a chamber 61 in a cylinder 61a, which pressure is representative of engine operation. When the engine stalls or tends to stall, the pressure in chamber 61 is reduced and the resistance 25 moves the right as viewed in FIG. 1, because a piston 62, connected with the resistance 25 through a rod 63, moves to the right in the cylinder 61a. The rod 63 is movable conjointly with the resistance 25 and has one end secured to the piston 62 and the other end secured to a piston 64. Piston 64 is slidable in a cylinder 65 and engages one end of a coil spring 66. The other end of the spring 66 is engaged by a piston 67 attached to a rod 68 pivotally connected to the throttle 60.

The chamber 61 formed between cylinder 61a and piston 62 is connected by a line 69 with the delivery side of an engine-driven pump 70 upstream of a restriction 71. A delivery line 72 of pump 70, which may be used to supply hydraulic fluid such as oil to an engine cooler (not shown), is at a constant pressure such as 200 p.s.i., because of a relief valve 73. This constant pressure is transmitted to a chamber 74 formed in the cylinder 65 between the pistons 64 and 67, by a line 75 connecting the chamber 74 with the delivery line 72.

When the throttle 60 is set for fast engine speed, the throttle acts through the rod 68, spring 66, and rod 63 to move the resistance 25 to the right as viewed in FIG. 1. With normal engine operation, the fast engine speed produces a relatively high pressure at the delivery side of pump 70 upstream of orifice 71 and in the chamber 61, moving the piston 62 and rod 63 toward the left as viewed in FIG. 1. Thus, with normal engine operation the end of the resistance 25 remote from the ground will be at take-off lead 26 or beyond it, so as to have no effect in reducing the transmission of the voltage at the take-off 20 to the terminal 22 and 48 of the control coils 23 and 47. When the throttle 60 is moved to the left for a low engine speed, this movement is balanced by reduction in pressure in the chamber 61 resulting from a lower engine speed, with the result that in normal engine operation the end of the resistance 25 away from the ground stays at the take-off lead 26. Whether the throttle 60 is set for high speed or low speed, a reduction in engine speed indicative of stalling of the engine results in lowering of the presssure in the chamber 61 and a rightward movement of the piston 62 and resistance 25, as viewed in FIG. 1. As a result, the take-off lead 26 in effect moves toward the grounded end of resistance 25 and has its voltage reduced toward the zero or ground voltage. The voltage of the terminals 22 and 48 is reduced in the same way, adn the pistons 43b and 44b are shifted for a slower speed of the vehicle drive mechanisms to counteract stalling of the engine.

The grounded resistance 39a is connected with the rod 63 and piston 62 similarly to the resistance 25, but during straight-line operation of the vehicle movment of the take-off lead 39b toward the grounded end of the resistance 39a due to engine stalling has no effect because during straight-line operation the circuit through switch arm 42 and contact 40 or 41 is open.

During turning, however, the circuit through switch 40 as well as that through switch 29 are closed, and those circuits through switches 30 and 49 are open so that the connection between the take-off leads 20 and 21 and the terminals 22 and 48 of the control coils 23 and 47 is completed by way of the arcuate conductor 37 and arcuate resistances 38 and 51, rather than the conductor 32 and take-off leads 31 and 50. If the vehicle is being turned to the left, the voltage at the terminal 48 is that at the take-off lead 26 because the terminal 48 and take-off lead 26 are connected through the take-off lead 51a and conductor 37. When stalling occurs, the voltage at the take-off lead 26 and that at the terminal 48 are reduced to the extent that the take-off lead is in effect moved toward the grounded end of the resistance 25, as previously set forth. On the other hand, the voltage at the terminal 22 of the control coil 23 of the valve 24 for the left-hand drive mechanism which during a left turn is being slowed, brought to zero, or reversed, is dependent upon the position of the take-off lead 39 with respect to the ends of arcuate resistance 38, which in the absence of stalling, are at +6 volts and −6 volts for the positions of the take-off leads 20 and 21, as shown in FIG. 1. If stalling occurs, theright end of the resistance 38 is reduced from +6 volts to some lesser voltage, for example, +4 volts, because of relative shifting of the take-off lead 26 toward the grounded end of the resistance 25. The −6 volts at the left end of the resistance 38 is reduced to a −4 volts by relative movement of the take-off lead 39b toward the grounded end of the resistance 39a, which is connected with the rod 63 so as to be movable therewith. Since the voltages at both ends of the arcuate resistance 38 reduced by the same percentage as a result of tendency of the engine to stall, the voltage at the take-off lead 39 contacting the resistance 38 is reduced by the same percentage for any position thereon. Thus, the voltage at the terminal 22 is reduced in the same percentage, and so, the left-hand drive mechanism is slowed whether being operated in forward or reverse and remains at zero if operated there before stalling of the engine.

When stalling occurs during a right turn of the vehicle, the voltage of the terminal 22 for the left side of the vehicle is determined by the position of the take-off lead 26 on the grounded resistance 25, since the voltage at the terminal 22 is that at the take-off lead 39 which is that at the take-off lead 26, since the take-off lead 39 will have moved along the conductor 37 toward the resistance 51. The ends of the right-hand resistance 51 are reduced in voltage by the repositioning of the the take-off leads 26 and 39b with respect to the grounded resistances 26 and 39a, respectively, in the same amount, and the voltage at the take-off lead 51a and that at the terminal 48 for the right-hand drive is proportionately reduced, whatever the position of the take-off lead 51a along the right-hand resistance 51.

It sometimes happens that the drive mechanisms do not drive the tractor at the same speed, even though the pumps for such mechanisms are presumably set through their tilting heads for the same speed in both drive mechanisms. Compensation for such difference in speeds is had through the grounded resistances 33 and 34 and the conductor 32 connecting them. The resistances 33 and 34 and conductor 32 are arranged so as to be movable longitudinally with a rod 75a secured to a piston 76 mounted in a cylinder 77. The piston 76 is centered by coil springs 78 and 79 acting against opposite ends thereof and against the inside of the ends of the cylinder 77. Chambers 80 and 81 formed in the cylinder 77 at opposite sides of the piston 76 are subjected to pressure supplied by gear pumps 82 and 83, respectively, which are driven by the right-hand driven mechanism and the left-hand drive mechanism, respectively, of the vehicle. The gear pumps 82 and 83 are controlled by intake valves 84 and 85 and pressure-relief valves 86 and 87 operating for example at about 100 lbs. When the drive mechanisms at the two sides of the vehicle are operated at the same speed, the take-off leads 39 and 50 both engage the conductor 32, so that the grounded resistances 33 and 34 have on effect upon the voltages at the terminals 22 and 48 of the control coils 23 and 47. When, however, for example, the right-hand drive mechanism has a higher speed, the pressure in the chamber 80 is higher than that in the chamber 81, with the result that the piston 76 is moved to the left as viewed in FIG. 1, causing the take-off lead 50 to move relatively toward the grounded end of the resistance 34 and the take-off lead 39 to stay in contact with the conductor 32. The result is that the voltage at the take-off lead 50 is reduced toward ground voltage as is the terminal 48 of the control coil 47. Thus, the piston 44b of the power unit 44 is repositioned for a slower drive of the right-hand drive mechanism. Meantime, there is no effect on the voltage at the terminal 22 of the control coil 23 or upon the piston 43b of the power unit 43, because the take-off lead 39, continuing in contact with the conductor 32, stays at the same voltage. When the left-hand drive mechanism has a greater speed than the one at the right, a greater pressure occurs in the chamber 81, whereby the piston 76 is moved to the right as viewed in FIG. 1, causing the take-off lead 39 to move relatively toward the grounded end of the resistance 33 and the take-off lead 50 to continue in contact with the conductor 32. thus, there is a reduction in voltage at the terminal 22 of the control coil 23 for the left-hand drive mechanism, with the result that there is a reduction in speed of the left-hand drive mechanism. The voltage at the terminal 48 of the control coil 47 remains the same, and so the speed of the right-hand drive mechanism stays the same.

The species of FIG. 3 differs from that of FIG. 1 in that the feed-back voltages at the terminals 52 of the valves 24 and 26 are produced by grounded tachometer generators 88 driven by the output shafts of the two drive mechanisms of the vehicle, rather than by the resistances 52c adjustable with respect to take-off leads 52b by the pistons 43b and 44b of the power units 43 and 44. Thus, the feed-back voltages truly reflect speeds of the drive mechanisms, instead of positions that hopefully represent such speeds. As a consequence, the speed compensator comprising the conductor 32 and resistances 33 and 34 and associated parts is omitted, and the switches 29 and 40 are replaced by simple conductors leading to the arcuate conductor 37 and the connection 51b from the take-off lead 26 and the take-off lead 39b, respectively.

In the two species of the invention of FIGS. 1 and 3, straight-line movement of the vehicle in forward and reverse is determined by the straight resistances 12 and 13 and the take-off leads 20 and 21 moving in straight lines therealong, and turning of the vehicle is determined by arcuate resistances 38 and 51 and rotatable or angularly movable take-off leads 39 and 51a movable therealong. Since straight-line movement of the vehicle is produced by straight-line movement of controls, and turning of the vehicle is produced by angular movement of other controls, both sets of controls can be tied to the single joy stick 53, which is moved in one way for straight-line movement and in another way for angular movement. Thus, as shown in FIG. 2, movement of the joy stick 53 in the direction of the arrows marked "FWD" and "REV" produces axial movment of the rod 57 with respect to the housing 58 and shifting of the take-off leads 20 and 21 along the resistances 12 and 13. The movement of the joy stick 53 in the direction of the arrows marked "RT. TURN" and "LT. TURN" rotates the rod 57, without shifting it axially, and rotates the rotor or rotors 59 with respect to the housing 58 and shifts the take-off leads 39 and 51a along the resistances 38 and 51. Since the rotor or rotors 59 are connected through the rod 57 with the joy stick 53, a compactness and unitariness of contstruction is achieved.

What is claimed is
1. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators, and the speeds of the drive mechanisms by the amount of impressed voltages and the balancing out thereof by equal feed-back voltages produced by the occurrence of the desired speeds of the drive mechanisms; and a joy stick is moved forwardly and rearwardly for forward and rearward movement of the vehicle and to the right and to the left for turning of the vehicle; the combination with the actuators and the joy stick, of a. a direction unit comprising first and second electrical resistances connected across a source of power, arranged in parallel with one another by connections between their ends, and extending generally in opposite directions from their connections with one another, said unit further comprising first and second takeoff leads contacting the first resistance and the second resistance, respectively, and being conjointly movable with respect thereto;

b. means connecting the joy stick with the direction unit to enable forward movement and rearward movement of the joy stick to produce movement in one direction and in the opposite direction of the first and second take-off leads with respect to the first and second resistances;

c. a steering unit comprising third and fourth resistances arranged in parallel with one another by connections between their ends and extending in opposite directions from their connections with one another; the first and second take-off leads, respectively, being connected with one connection and the other connection between the ends of the third and fourth resistances, the steering unit further comprising third and fourth leads contactable with the third and fourth resistances, respectively, and being connected with one actuator and the other actuator respectively; and d. means connecting the joy stick with the steering unit to enable rightward movement and leftward movement of the joy stick to produce conjoint movement of the third and fourth resistances with respect to the third and fourth take-off leads in one direction and in the opposite direction, respectively.

2. In a vehicle in which two drive mechanisms are driven at the same speed in given direction for straight forward movement of the vehicle, at the same speed in the opposite direction for straight rearward movment of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanisms; and a joy stick is moved forwardly and rearwardly for forward and rearward movement of the vehicle and to the right and to the left for turning of the vehicle;

the combination with the actuators and the joy stick, of
a. a direction unit comprising first and second electrical resistances connected in parallel across a source of power and extending generally straight in opposite directions from their points of connection with one another, said unit further comprising first and second takeoff leads contacting the first resistance and the second resistance, respectively, and being conjointly movable with respect thereto in a direction therealong;

b. means connecting the joy stick with the direction unit to enable forward movement and rearward movement of the joy stick to produce movement in one direction and in the opposite direction of the first and second takeoff leads with respect to the first and second resistances;

c. a steering unit comprising third and fourth resistances arranged in parallel with one another by connections between their ends and extending in opposite directions from their connections with one another; the first and second takeoff leads, respectively, being connected with one connection and the other connection between the ends of the third and fourth resistances, the steering unit further comprising third and fourth leads contactable with the third and fourth resistances, respectively, and being connected with one actuator and the other actuator respectively; and d. means connecting the joy stick with the steering unit to enable rightward movement and leftward movement of the joy stick to produce angular movements of the thrid and fourth resistances with respect to the third and fourth takeoff leads in one direction and in the opposite direction, respectively.

3. In a vehicle in which two drive mechanisms are driven at the same speed in a given direction for straight forward movement of the vehicle at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanisms; and a joy stick is moved forwardly and rearwardly for forward and rearward movement of the vehicle and to the right and to the left for turning of the vehicle; the combination with the actuators and the joy stick, of a. a direction unit comprising first and second electrical resistances connected across a source of power, arranged in parallel with one another by connections between their ends, and extending in opposite directions from their connections with one another, said unit further comprising first and second takeoff leads contacting the first resistance and the second resistance, respectively;

b. means connecting the joy stick with the direction unit to enable forward movement and rearward movement of the joy stick to produce movement in one direction and in the opposite direction of the first and second takeoff leads with respect to the first and second resistances;

c. a steering unit comprising third and fourth resistances extending generally arcuately in opposite directions from adjacent spaced ends to remote spaced ends and being in parallel with connections between their adjacent ends and between their remote ends, the first and second takeoff leads being connected to the adjacent ends and to the remote ends, respectively, of the third and fourth resistances, the steering unit further comprising third and fourth takeoff leads contactable with the third and fourth resistances, respectively, and with the connection between the adjacent ends thereof and being connected with one actuator and the other actuator, respectively; and d. means connecting the joy stick with the steering unit to enable rightward movement and leftward movement of the joy stick to produce angular movements of the third and fourth resistances with respect to the third and fourth takeoff leads in one direction and in the opposite direction, respectively.

4. In a vehicle in which two drive mechanisms are driven at the same speed in a given direction for straight forward movement of the vehicle, at the same speed in the opposite direction for straight rearward movment of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanisms; and a joy stick is moved forwardly and rearwardly for forward and rearward movement of the vehicle and to the right and to the left for turning of the vehicle;

the combination with the actuators and the joy stick of a. a direction unit comprising first and second electrical resistances connected in parallel across a source of power and extending generally straight in opposite directions from connections with one another, said unit further comprising first and second take-off leads contacting the first resistance and the second resistance, respectively;

b. means connecting the joy stick with the direction unit to enable forward movement and rearward movement of the joy stick to produce movement in one direction and in the opposite direction of the first and second take-off leads with respect to the first and second resistances;

c. a steering unit comprising third and fourth resistances extending generally arcuately in opposite directions from adjacent spaced ends to remote spaced ends and being in parallel with connections between their adjacent ends and between their remote ends, the first and second takeoff leads being connected to the adjacent ends and to the remote ends, respectively, of the third and fourth resistances, the steering unit further comprising third and fourth takeoff leads contactable with the third and fourth resistances, respectively, and with the connection between the adjacent ends thereof and being connected with one actuator and the other actuator, respectively, and being conjointly movable with respect thereto in a direction therealong; and d. means connecting the joy stick with the steering unit to enable rightward movement and leftward movement of the joy stick to produce angular movements of the third and fourth resistances with respect to the third and fourth takeoff leads in one direction and in the opposite direction, respectively.

5. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanisms, and a joy stick is moved forwardly and rearwardly for forward and rearward movement of the vehicle and to the right and to the left for turning of the vehicle;

the combination with the actuators and the joy stick, of a. a direction unit comprising first and second electrical resistances connected across a source of power in parallel with one another with two connections at their ends, the direction unit further comprising first and second takeoff leads contacting the first resistance and the second resistance, respectively, and being movable therealong;

b. means connecting the joy stick with the direction unit so as to enable forward movement of the joy stick to increase the portion of the first resistance between one of the said two connections and the first takeoff lead to decrease the portion of the second resistance between the said one connection and the second takeoff lead and rearward movement of the joy stick to decrease the portion of the first resistance between one of the said one connection and the first takeoff lead and to increase the portion of the second resistance between the said one connection and the second takeoff lead;

c. a steering unit comprising third and fourth electrical resistances connected in parallel with one another with two connections at their ends, the first takeoff line and the second takeoff line, respectively, being connected to one connection and the other connection between the third and fourth resistances, the steering unit further comprising third and fourth takeoff leads contactable with the third and fourth resistances, respectively, and being connected with one actuator and the other actuator, respectively; and d. means connecting the joy stick with the steering unit to enable rightward movement of the joy stick to decrease the portion of the third resistance between one of the last mentioned connections and the third takeoff lead without affecting the portion of the fourth resistance between said one connection and the fourth takeoff lead and leftward movement of the joy stick to decrease the portion of the fourth resistance between said one connection and the fourth takeoff lead without affecting the portion of the third resistance between said one connection and the fourth takeoff lead.

6. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanisms; and a joy stick is moved forwardly and rearwardly for forward and rearward movement of the vehicle and to the right and to the left for turning of the vehicle;

the combination with the actuators and the joy stick, of a. a direction unit comprising first and second electrical resistance connected across a source of power in parallel with one another with two connections at their ends, the direction unit further comprising first and second takeoff leads contacting the first resistance and the second resistance, respectively, and being movable therealong;

b. means connecting the joy stick with the direction unit so as to enable forward movement of the joy stick to increase the portion of the first resistance between one of the said two connections and the first takeoff lead to decrease the portion of the second resistance between the said one connection and the second takeoff lead and rearward movement of the joy stick to decrease the portion of the first resistance between one of the said one connection and the first takeoff lead and to increase the portion of the second resistance between the said one connection and the second takeoff lead;

c. a steering unit comprising third and fourth resistances extending generally arcuately in opposite directions from adjacent spaced ends to remote spaced connected ends, a generally arcuate conductor of appreciable length connecting the adjacent spaced ends, and third and fourth takeoff leads contactable with the third and fourth resistances, respectively, and with the conductor and being connected with one actuator and the other actuator, respectively, the first takeoff line and the second takeoff line, respectively, being connected to the conductor and to the remote ends of the third and foruth resistances; and d. means connecting the joy stick with the steering unit to enable rightward movement of the joy stick to decrease the portion of the third resistance between the remote end thereof and the third takeoff lead and the fourth takeoff lead to move along the conductor toward the third resistance and leftward movement of the joy stick to decrease the portion of the fourth resistance between the remote end thereof and the fourth takeoff lead and third takeoff lead to move along the conductor toward the fourth resistance.

7. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages produced by the occurrence of the desired speeds of the drive mechanisms; and a joy stick is moved forwardly and rearwardly for forward and rearward movement of the vehicle and to the right and to the left for turning of the vehicle;

the combination with the actuators and the joy stick, of a. a direction unit comprising first and second electrical resistances connected in parallel across a source of power and extending generally straight in opposite directions form one another, the resistance having a first connection between their adjacent ends and a second connection between their remote ends, the direction unit further comprising first and second takeoff leads contacting the first resistance and the second resistance, respectively;

b. means connecting the joy stick with the direction unit so as to enable forward movement of the joy stick to increase the portion of the first resistance between the first connection and the first takeoff lead and to decrease the portion of the second resistance between the first connection and the second takeoff lead and rearward movement of the joy stick to decrease the portion of the first resistance between the first connection and the first takeoff lead and to increase the portion of the second resistance between the first connection and the second takeoff lead;

c. a steering unit comprising third and fourth resistances extending generally arcuately in opposite directions from adjacent spaced ends to remote spaced connected ends, a generally arcuate conductor of appreciable length connecting the adjacent spaced ends, and third and fourth takeoff leads contactable with the third and fourth resistances, respectively, and with the conductor and being connected with one actuator and the other actuator, respectively, the first takeoff line and the second takeoff line, respectively, being connected to the conductor and to the remote neds of the third and fourth resistances; and d. means connecting the joy stick with the steering unit to enable leftward movement of the joy stick to swing the third and fourth takeoff leads angularly in one direction with respect to the third and fourth resistances and the conductor and thus to decrease the portion of the third resistance between the remote end thereof and the third takeoff lead by movement of the latter along the third resistance toward the remote end thereof while operating without effect on the fourth resistance by moving the fourth takeoff lead along the conductor toward the third resistance and rightward movement of the joy stick to swing the third and fourth takeoff leads angularly in the opposite direction with respect to the third and fourth resistances and the conductor and thus to decrease the portion of the fourth resistance between the remote end thereof and the fourth takeoff lead by movement of the latter along the fourth resistance toward the remote end thereof while operating without effect on the third resistance by moving the third takeoff lead along the conductor toward the fourth resistance.

8. In a vehicle in which two drive mechanisms are driven at the same speed in a given direction for straight forward movement of the vehicle, at the same speed in the opposite direction for straight rearward movement of the vehicle, and in opposite directions or at different speeds in the same direction for steering of the vehicle; two actuators control the direction of drive of the drive mechanisms by the sign of the voltages impressed across the actuators and the speeds of the drive mechanisms by the amount of impressed voltages and the balancing out thereof by equal feed-back voltages produced by the occurrence of the desired speeds of the drive mechanism; each actuator is subject to ground or zero feed-back voltage when the associated drive mechanism is stopped; and a joy stick is moved forwardly and rearwardly for forward and rearward movement of the vehicle and to the right and to the left for turning of the vehicle;

the combination with the actuators and the joy stick, of a. a direction unit comprising first and second electrical resistances connected in parallel across a grounded source of power, a first connection between ends of the first and second resistances being at a positive voltage with respect to ground, a second connection between the other ends of the first and second resistances being at a negative voltage with respect to ground, the first and second resistances extending generally in opposite directions from adjacent ends, the direction unit further comprising first and second takeoff leads contacting the first resistance and the second resistance, respectively, and being conjointly movable therealong;

b. means connecting the joy stick with the direction unit so as to enable forward movement of the joy stick to increase the portion of the first resistance between the first connection and the first takeoff lead and to decrease the portion of the second resistance between the second connection and the second takeoff lead for providing a positive voltage at the first takeoff lead and a negative voltage at the second takeoff lead and rearward movement of the joy stick to decrease the portion of the first resistance between the first connection and the first takeoff lead and to increase the portion of the second resistance between the second connection and the second takeoff lead for providing a negative voltage at the first takeoff lead and a positive voltage at the second takeoff lead;

c. a steering unit comprising third and fourth resistances extending generally arcuately in opposite directions from adjacent spaced ends to remote spaced connected ends, a generally arcuate conductor of appreciable length connecting the adjacent spaced ends of the third and fourth resistances, and third and fourth takeoff leads contactable with the third and fourth resistances, respectively, and with the conductor and being connected with one actuator and the other actuator, respectively, the first takeoff line and the second takeoff line, respectively, being connected to the conductor and to the remote ends of the third and fourth resistances; and d. means connecting the joy stick with the steering unit to enable leftward movement of the joy stick to swing the third and fourth takeoff leads angularly in one direction with respect to the third and fourth resistances and the conductor and thus to switch the sign of the voltage applied to the third takeoff lead by movement of the latter along the third resistance toward the remote end thereof while maintaining the quantity and sign of the voltage applied to the fourth takeoff lead by moving the fourth takeoff lead along the conductor toward the third resistance and rightward movement of the joy stick to swing the third and fourth takeoff leads angularly in the opposite direction with respect to the third and fourth resistances and the conductor and thus to switch the sign of the voltage applied to the fourth takeoff lead by movement of the latter along the fourth resistance toward the remote end threof while maintaining the quantity and sign of the voltage applied to the third takeoff lead by moving the third takeoff lead along the conductor toward the fourth resistance.

9. The combination specified in claim 8 and further comprising an anti-stall mechanism comprising a fifth resistance grounded at one end, a fifth takeoff lead movable therealong and forming therewith part of the second takeoff line, and means responsive to a decrease in pressure due to approach or occurrence of stalling of the engine for shifting the fifth resistance and takeoff lead with respect to one another so as relatively to move the fifth takeoff lead toward the grounded end of the fifth resistance.

10. The combination specified in claim 9 and further comprising means for assuring equal speeds of the two drive mechanisms when operated for straight forward movement or straight rearward movement of the vehicle, said means comprising sixth and seventh resistances extending generally in opposite directions from adjacent spaced ends to remote spaced grounded ends, a second conductor connecting the adjacent ends of the sixth and seventh resistances and being connected to the first takeoff lead, sixth and seventh takeoff leads contactable with the sixth and seventh resistances, respectively, and with the second conductor and connectable with the connections between the fourth and fifth takeoff leads and the two actuators, and means responsive to difference in speeds of the two drive mechanisms for shifting the sixth and seventh resistances and second conductor with respect to the sixth and seventh takeoff leads in one direction to decrease the portion of the sixth resistance between its grounded end and the sixth takeoff lead while operating without effect on the seventh resistance by relatively moving the seventh takeoff lead along the second conductor toward the sixth resistance and in the opposite direction to decrease the portion of the seventh resistance between its grounded end and the seventh takeoff lead while operating without effect on the sixth resistance by relatively moving the sixth takeoff lead along the second conductor toward the seventh resistance; the steering unit being disconnected from the direction unit by positioning of the joy stick between positions to the right and left for steering of the vehicle, the equalizer being taken out of operation by movement of the joy stick to the left or right for steering of the vehicle.

* * * * *